Patented June 4, 1940

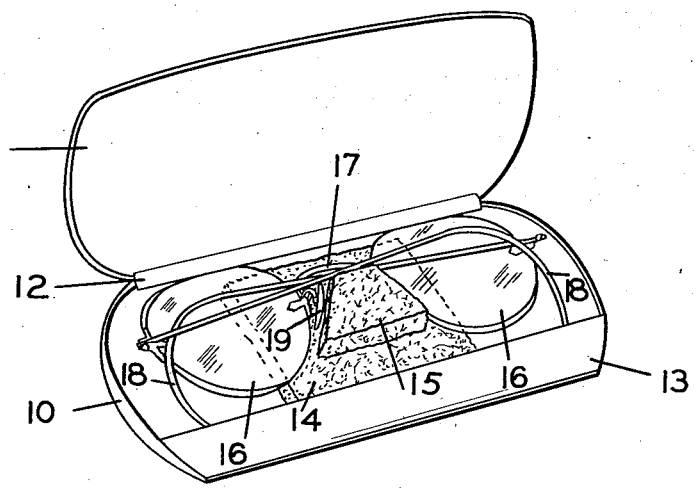
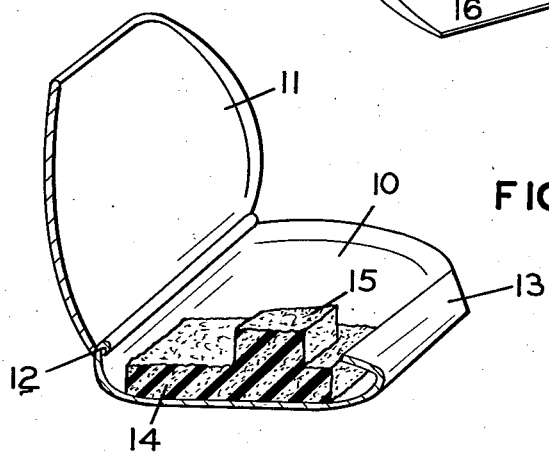
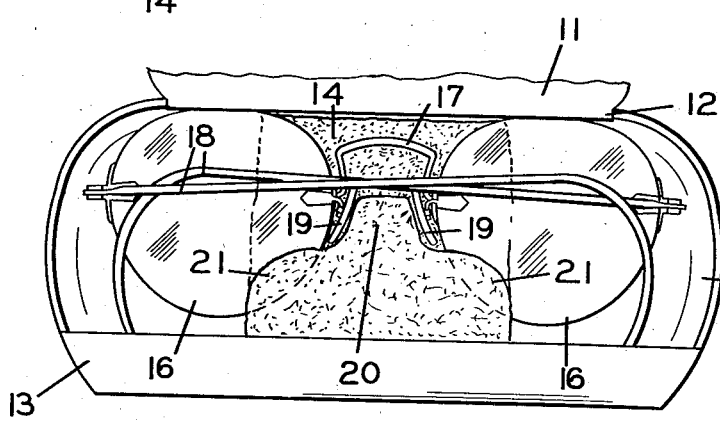

2,203,402

UNITED STATES PATENT OFFICE 2,203,402

SPECTACLE CASE

Carl L. Bausch, Rochester, N. Y., assignor to Bausch & Lomb Optical Company, Rochester, N. Y., a corporation of New York Application May 21, 1937, Serial No. 144,017

2 Claims. (Cl. 206—6)

The present invention relates to spectacle cases for protecting the spectacles against breakage.

One of the objects of the present invention is to provide a spectacle case having a cushion for protecting the spectacles against breakage. Another object is to provide a cushioning means for spectacle cases. These and other objects and and more particularly to cases having a cushion advantages reside in certain novel features of construction, arrangement and combination of parts as will hereinafter be more fully set forth and pointed out in the appended claims.

Referring to the drawing:

Fig. 1 is a perspective view of a spectacle case embodying the present invention.

Fig. 2 is a perspective view showing a central section of the case shown in Fig. 1.

Fig. 3 is a plan view of the bottom of a modified form of case.

The spectacle case illustrated in Figs. 1 and 2 is composed of a bottom member 10 and a top member 11 connected along one edge by a hinge indicated at 12. The bottom member 10 is provided with the usual lip 13. Secured centrally of the bottom member 10 is a resilient cushion 14 of sponge rubber or the like, having a projection 15.

The case is adapted to receive the conventional spectacles having two lenses 16 connected by a bridge 17 and provided with temples 18 and nose pads 19. The cushion 14 engages both lenses 16, and the bridge 17 and the projection 15 extends up between the lenses 16 and is engaged by the nose pads 19. Thus the spectacles are both cushioned and held against lateral sliding movement in the case.

In the modification shown in Fig. 3, the construction is the same as in Figs. 1 and 2 except that the projection 20 is provided with two lateral extensions 21 which, together with the cushion 14, form slots into which the edges of the lenses 16 fit. The lenses 16 are thus cushioned from both top and bottom in this modified form of the invention.

From the foregoing, it will be apparent that I am able to attain the objects of my invention and provide a spectacle case having a cushion for protecting the spectacles against breakage. While the present invention has been illustrated in connection with spectacles of the rimless type, obviously it is equally applicable to any type of spectacle or eyeglass. Various modifications can, of course, be made without departing from the spirit of my invention or the scope of the appended claims.

I claim:

1. A spectacle case comprising a bottom member, a top member, hinge means for pivotally connecting said members along one edge, a sponge rubber cushion secured in the central part of the bottom member for engagement by the bridge and lenses of a pair of spectacles, a projection extending upwardly from said cushion for engagement by the nose pads of said spectacles, and lateral extensions on said projection covering an edge of each of said lenses.

2. A spectacle case comprising a bottom member, a top member, hinge means for pivotally connecting said members along one edge, a resilient cushion secured to said bottom member and extending vertically therefrom for engagement by the bridge and lenses of a pair of spectacles, and horizontal slot means in said cushion for receiving an edge of said lenses.

CARL L. BAUSCH.